United States Patent [19]
Yasui et al.

[11] Patent Number: 5,922,036
[45] Date of Patent: Jul. 13, 1999

[54] LANE DETECTION SENSOR AND NAVIGATION SYSTEM EMPLOYING THE SAME

[75] Inventors: Nobuhiko Yasui, Moriguchi; Atsushi Iisaka, Takatsuki; Mamoru Kaneko, Yokohama, all of Japan

[73] Assignee: Matsushita Electric Industrial Co., Ltd., Osaka, Japan

[21] Appl. No.: 08/864,428

[22] Filed: May 28, 1997

[30] Foreign Application Priority Data

May 28, 1996 [JP] Japan .................................... 8-133191

[51] Int. Cl.⁶ ........................... G06F 165/00; G06K 9/36
[52] U.S. Cl. .............................. 701/28; 701/23; 701/213; 701/301; 382/104; 342/436
[58] Field of Search ................................. 701/28, 23, 30, 701/93, 96, 98, 117, 300, 301; 340/435, 436, 937, 439, 905, 990; 348/118, 113; 382/168, 281, 104, 154

[56] References Cited

U.S. PATENT DOCUMENTS

| | | | |
|---|---|---|---|
| 4,884,072 | 11/1989 | Horsch | 340/937 |
| 5,274,718 | 12/1993 | Leonardi et al. | 382/56 |
| 5,301,115 | 4/1994 | Nouso | 701/300 |
| 5,351,044 | 9/1994 | Mathur et al. | 340/901 |
| 5,555,312 | 9/1996 | Shima et al. | 701/301 |
| 5,555,555 | 9/1996 | Sato et al. | 382/104 |
| 5,642,093 | 6/1997 | Kinoshita et al. | 701/1 |
| 5,661,472 | 8/1997 | Koshizawa | 701/301 |
| 5,675,489 | 10/1997 | Pomerleau | 701/28 |
| 5,751,228 | 5/1998 | Kamiya et al. | 701/200 |
| 5,757,949 | 5/1998 | Kinoshita et al. | 701/1 |
| 5,790,403 | 8/1998 | Nakayama | 340/435 |

FOREIGN PATENT DOCUMENTS

| | | |
|---|---|---|
| 0 341 985 | 11/1989 | European Pat. Off. . |
| 0 361 914 | 4/1990 | European Pat. Off. . |
| 0 586 857 | 3/1994 | European Pat. Off. . |
| 0 697 641 | 2/1996 | European Pat. Off. . |
| 7-85249 | 3/1995 | Japan . |
| 7-141592 | 6/1995 | Japan . |
| 7-306997 | 11/1995 | Japan . |

*Primary Examiner*—Jacques H. Louis-Jacques
*Attorney, Agent, or Firm*—Wenderoth, Lind & Ponack, L.L.P.

[57] ABSTRACT

A lane detection sensor for detecting opposite lane markers of a road, comprising: an image shooting member for shooting an image of the road ahead of a running motor vehicle; an image data memory for storing data on the image of the road from the image shooting member; a contour point extracting member for extracting, by using the data on the image of the road stored in the image data memory, contour points corresponding to the lane markers of the road; a curve detecting member for calculating polynomial curves by using the contour points corresponding to the lane markers of the road from the contour point extracting member; a Hough transformation limiting member for bounding a region of Hough transformation by using coefficients of the polynomial curves calculated by the curve detecting member; a Hough transformation member for performing Hough transformation by using the polynomial curves from the curve detecting member and the region of Hough transformation bounded by the Hough transformation limiting member; and a Hough transformation detecting member which obtains a maximum value of accumulators in Hough space so as to detect a curve corresponding to the maximum value of the accumulators.

8 Claims, 15 Drawing Sheets

5,922,036

LANE DETECTION SENSOR AND NAVIGATION SYSTEM EMPLOYING THE SAME

BACKGROUND OF THE INVENTION

The present invention generally relates to a first lane detection sensor for detecting opposite lane markers of a road, in which the lane markers are preliminarily obtained as a plurality of spline curves and points in Hough space are obtained by using coefficients of the spline curves corresponding to the lane markers so as to obtain the lane markers at high speed, a second lane detection sensor for detecting opposite lane markers of a road, in which the lane markers are detected by using a low-resolution image from a high-definition image so as to detect curves of the lane markers smoothly, a third lane detection sensor for detecting opposite lane markers of a road, in which shapes of curves of the lane markers ahead of a running motor vehicle are forecast by using a map data base, an arithmetic unit for approximating a radius of curvature of a road from an angle formed between two tangents for the lane markers, a first navigation system for storing data of a road on which a motor vehicle has run and a second navigation system for guiding a driver from a lane on which his motor vehicle is running and position of the lane.

A conventional lane detection sensor is disclosed in, for example, Japanese Patent Laid-Open Publication No. 5-151341 (1993) as shown in FIG. 16. The known lane detection sensor includes an image input means 100 for shooting an image of a road ahead of a running motor vehicle, a preparation means 101 which receives a signal from the image input means 100 so as to extract an edge point, a line adaptation means 102 which sets a window in the vicinity of a linear equation obtained at the time of a previous arithmetic operation and measures coordinates of a plurality of edge points in the set window so as to obtain a plurality of linear equations through linear approximation, a line and vanishing point determining means 104 which estimates x- and y-coordinates of a vanishing point and amounts corresponding to slopes of straight lines passing through the vanishing point on the basis of the obtained linear equations so as to minimize a sum of square of errors among the linear equations and sets these estimated values to a result of this time, an edge point tracing means 103 which extracts, on the basis of a result of the preparation means 101 and a detection result of the linear adaptation means 102, an edge point corresponding to a lane marker, a curve adaptation means 105 which applies a curved equation to the extracted edge point and a smoothing means 106 for smoothing a result of the curve adaptation means 105.

In this known lane detection sensor, application of the curved equation is performed by method of least squares and therefore, is readily affected by noises. As a result, it is impossible to detect the lane makers accurately.

Meanwhile, a known detection apparatus for detecting a radius of curvature of a road is disclosed in, for example, Japanese Patent laid-Open Publication No. 2-115905 (1990) as shown in FIG. 17. The known detection apparatus includes an imaging means 107 for shooting an image of an external environment, a detection means 108 for detecting from the image a target along a route of a running motor vehicle and relative positional relation between the target and the running motor vehicle, a track generating means 109 for generating a track regulated by a predetermined function based on the relative positional relation and a control means 110 for controlling running of the motor vehicle in accordance with the generated track.

In this prior art detection apparatus, since the radius of curvature of the road is determined on the basis of the distant landmark, errors of the radius of curvature of the road are large and thus, it is impossible to obtain the radius of curvature of the road accurately.

Furthermore, conventionally, a navigation system loaded on a motor vehicle can receive only predetermined map data but cannot receive data available during running of the motor vehicle. In addition, in the conventional navigation system, it has been difficult to guide the motor vehicle accurately when the motor vehicle is running across a plurality of lanes.

SUMMARY OF THE INVENTION

Accordingly, an essential object of the present invention is to provide, with a view to eliminate the above mentioned disadvantages of prior art, a lane detection sensor in which points in Hough space are determined by using coefficients of curves obtained preliminarily as spline curves and lane markers of a road can be detected as curves rapidly. Meanwhile, in the lane detection sensor of the present invention, since data the shape of the road for subsequent running of the motor vehicle and curves ahead of the motor vehicle are obtained from a map data base, the lane markers of the road can be detected accurately. Furthermore, in the lane detection sensor of the present invention, since correlation between preliminarily stored patterns of shape of the road and contour points of the lane markers of the road are taken, the lane markers of the road can be detected accurately.

Another object of the present invention is to provide an arithmetic unit for calculating a radius of a curvature of a road ahead of a running motor vehicle, in which since two tangents at two positions spaced at arbitrary distances from a point ahead of the motor vehicle are obtained by using contour points corresponding to the road and the radius of curvature of a lane on which the motor vehicle is running is approximately calculated from an angle formed between the two tangents, the radius of curvature of the lane on which the motor vehicle can be obtained accurately.

A further object of the present invention is to provide a navigation system in which a unique map can be formulated by measuring width and the number of lanes of a road and can be used as a guide at the time of another running on the road. By detecting position of the lane on which the motor vehicle is running and the number of the lanes, the navigation system of the present invention is capable of guiding the motor vehicle accurately.

In order to accomplish these objects of the present invention, a lane detection sensor for detecting opposite lane markers of a road, according to the present invention comprises: an image shooting means for shooting an image of the road ahead of a running motor vehicle; an image data memory means for storing data on the image of the road from the image shooting means; a contour point extracting means for extracting, by using the data on the image of the road stored in the image data memory means, contour points corresponding to the lane markers of the road; a curve detecting means for calculating polynomial curves by using the contour points corresponding to the lane markers of the road from the contour point extracting means; a Hough transformation limiting means for bounding a region of Hough transformation by using coefficients of the polynomial curves calculated by the curve detecting means; a Hough transformation means for performing Hough transformation by using the polynomial curves from the curve detecting means and the region of Hough transformation bounded by the Hough transformation limiting means; and a Hough transformation detecting means which obtains a maximum value of accumulators in Hough space so as to detect a curve corresponding to the maximum value of the accumulators.

Meanwhile, an arithmetic unit for calculating a radius of curvature of a road ahead of a running motor vehicle, according to the present invention comprises: a n image shooting means for shooting an image of the road; a contour point extracting means for extracting from data on the image of the road from the image shooting means, contour points corresponding to opposite lane markers of the road; a tangent calculating means which obtains, by using the contour points from the contour point extracting means, two tangents at two positions spaced arbitrary distances from a point ahead of the motor vehicle; a coordinate transformation means for transforming the two tangents from the tangent calculating means into a real global system of coordinates; and a calculating means for approximately calculating from an angle formed between the two tangents in the real global system of coordinates, the radius of curvature of a lane on which the motor vehicle is running.

Furthermore, a navigation system according to the present invention comprises: an image shooting means for shooting an image of a road ahead of a running motor vehicle; a contour point extracting means for extracting from data on the image of the road from the image shooting means, contour points corresponding to opposite lane markers of the road; a lane detecting means for detecting, by using the contour points from the contour point extracting means, the road on which the motor vehicle is running and the lane markers of lanes of the road; a map data base for storing data on the road on a map; a GPS (global positioning system) calculating means for estimating current position of the motor vehicle upon reception of electromagnetic wave from a GPS; a road condition detecting means which obtains width and the number of the lanes from position and shape of the lane markers in the image from the lane detecting means; a road condition storage means for storing, in accordance with the current position of the motor vehicle from the GPS calculating means, the width and the number of the lanes from the road condition detecting means in association with the data on the road on the map of the map data base; and a display means for displaying the current position of the motor vehicle from the GPS calculating means, the data on the road on the map from the map data base and data on the road on which the motor vehicle is running, from the road condition storage means.

BRIEF DESCRIPTION OF THE DRAWINGS

These objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
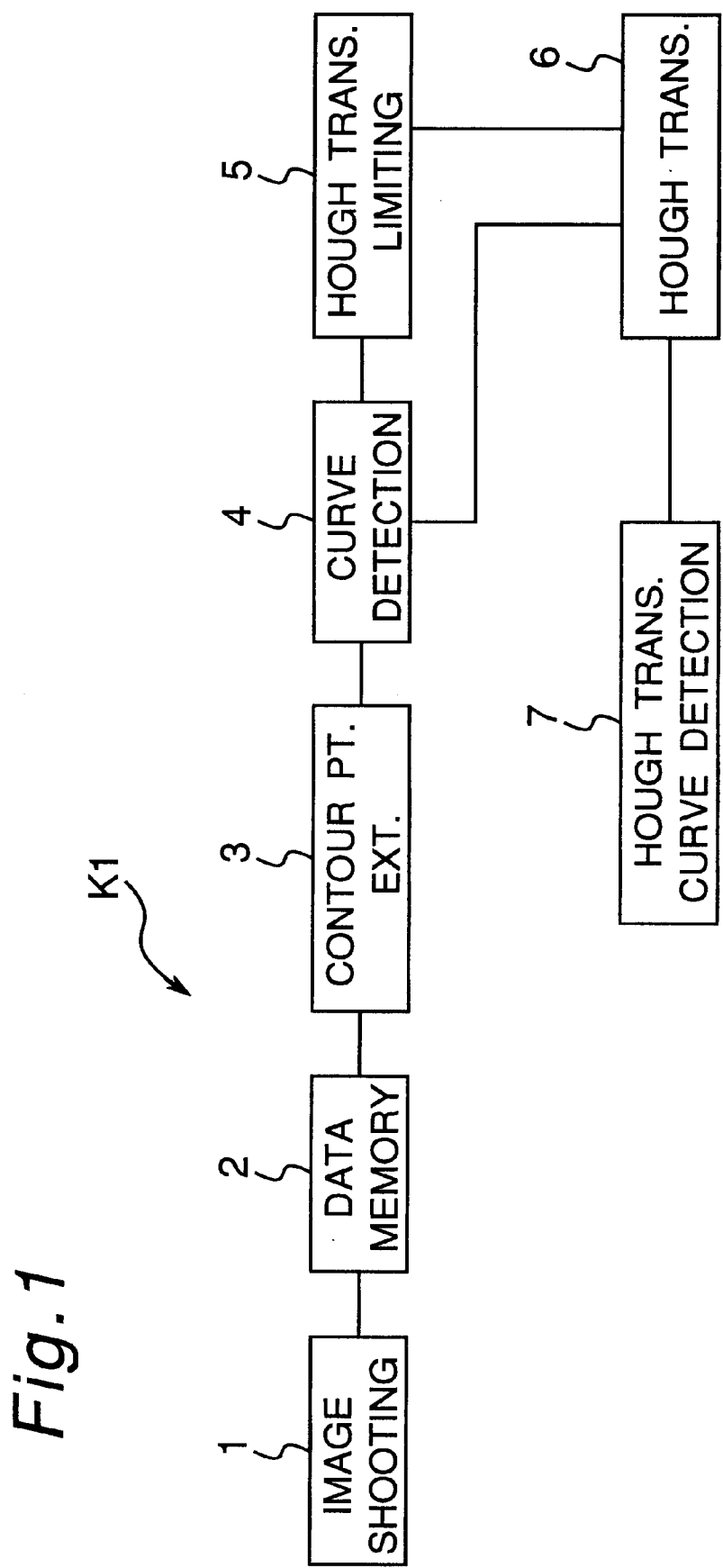
FIG. 1 is a block diagram of a lane detection sensor according to a first embodiment in one aspect of the present invention.

FIG. 1 shows a lane detection sensor K1 for detecting opposite lane markers of a road, according to a first embodiment in one aspect of the present invention. Each of the lane markers is formed by, for example, a white line drawn on the road. The lane detection sensor K1 includes an image shooting means 1 for shooting an image of the road ahead of a running motor vehicle, an image data memory means 2, a contour point extracting means 3, a curve detecting means 4, a Hough transformation limiting means 5, a Hough transformation means 6 and a detection means 7 for detecting a curve subjected to Hough transformation.

Figure 2:
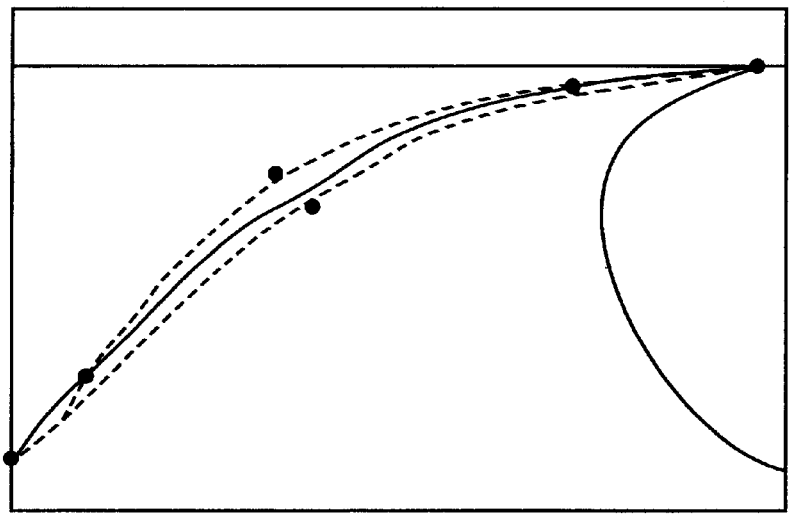
FIG. 2 is a view showing one example of a polynomial curve obtained by using contour points in the first embodiment of FIG. 1.
Figure 3:
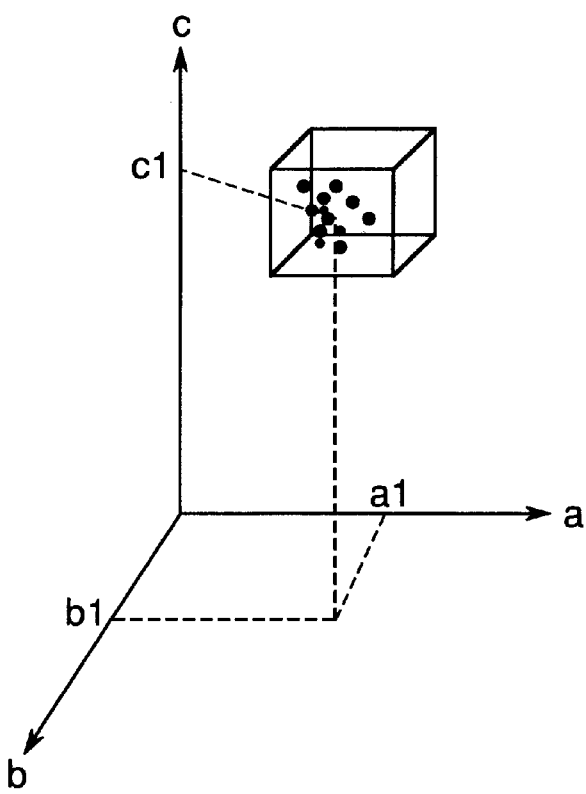
FIG. 3 is a view in which points corresponding to polynomial coefficients are provided in Hough space in the first embodiment of FIG. 1.

Operation of the lane detection sensor K1 of the above described arrangement is described, hereinafter. Initially, the image of the road ahead of the running motor vehicle is inputted to the lane detection sensor K1 from the image shooting means 1. The inputted image data of the road is temporarily stored in the image data memory means 2. In the contour point extracting means 3, an edge is obtained by using the image data of the road stored in the image data memory means 2 and a threshold value is set from edge intensity of the whole image so as to find edge intensities exceeding initially the threshold value by scanning the image upwardly from a bottom portion of the image and laterally in opposite directions from a center of the image such that the edge intensities are set as contour points of the right and left lane markers of the road. In the curve detecting means 4, a plurality of curves corresponding to the lane markers as shown in FIG. 2 are detected as polynomials by using the above mentioned contour points. Then, in the Hough transformation limiting means 5, a bounded region of Hough space is determined by using coefficients of a polynomial curve obtained by using all the contour points of the curves obtained in the curve detecting means 4. Then, as shown in FIG. 3, by using the coefficients of a plurality of the polynomials of the curves, points corresponding to the coefficients of the curves are arranged in Hough space by the Hough transformation means 6. In the detection means 7, positions of the points arranged in Hough space are obtained and equations of the lane markers of the road in the image are calculated.

Figure 4:
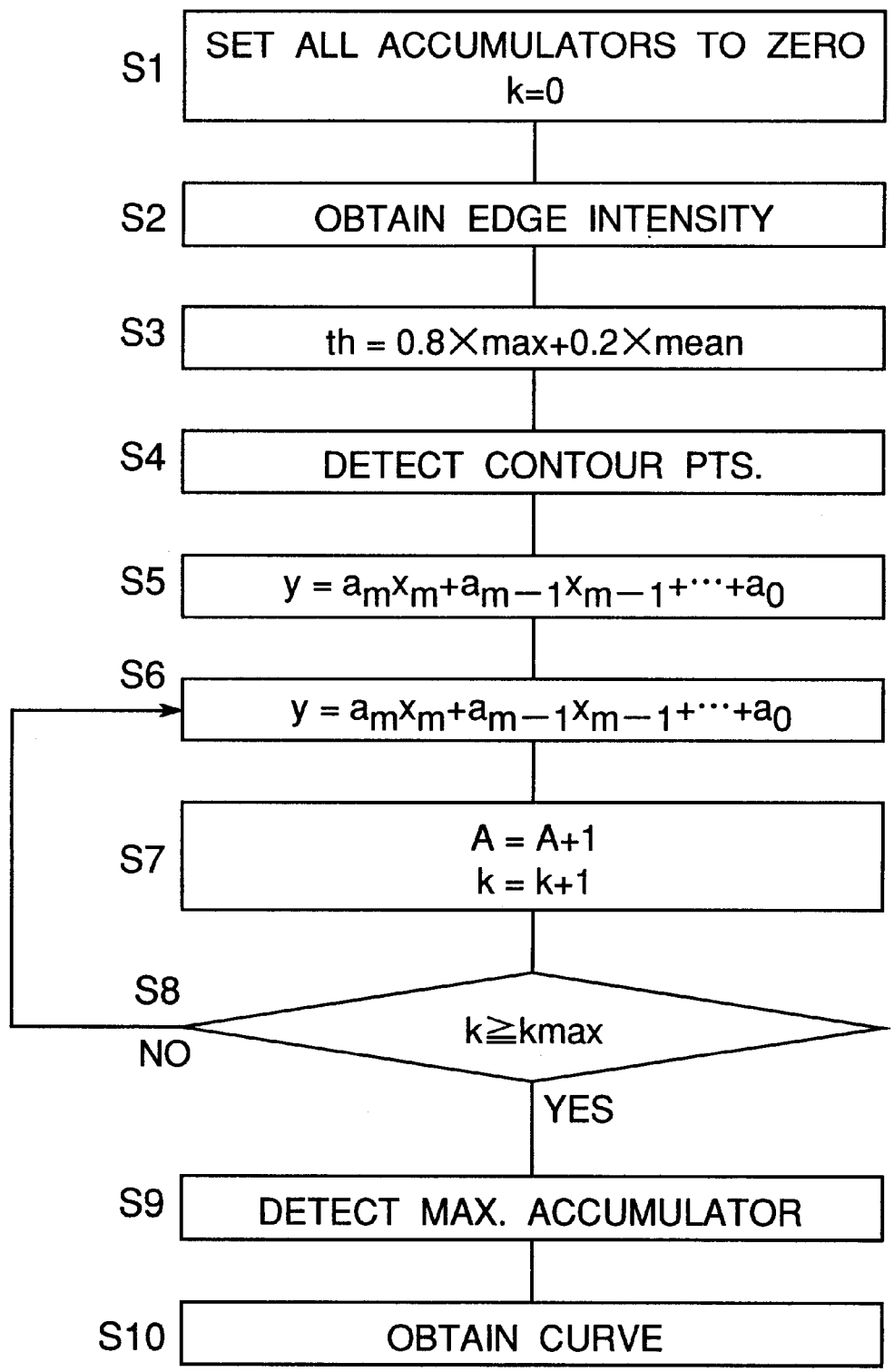
FIG. 4 is a flowchart showing processing sequences of the lane detection sensor of FIG. 1.

Then, processing sequences of the lane detection sensor K1 are described with reference to a flowchart of FIG. 4. Initially, at step S1, all accumulators in Hough space are set to zero and a count k of a counter is also set to zero. At step S2, edge intensity of the image data stored in the image data memory means 2 is obtained by using a Sobel filter. Then, at step S3, a threshold value th is calculated by using the following equation:

$$th = 0.8 \times max + 0.2 \times mean$$

wherein "max" denotes a maximum value of edge intensity in the image and "mean" denotes a mean value of edge intensity. At step S4, points exceeding initially this threshold value th are retrieved by scanning the image upwardly from the bottom portion of the image and laterally in opposite directions from the center of the image and are set as contour points of the right and left lane markers of the road. Subsequently, at step S5, a spline curve is calculated by using all the contour points of each of the right and left lane markers of the road and a region extending over ±α from coefficients of the spline curve is created in Hough space. At step S6, polynomials for the right and left lane markers are obtained separately by using the contour points of each of the right and left lane markers. By selecting n contour points from the N contour points of the left lane marker on the assumption that n and N (N≧n) are natural numbers, the following approximate equation y of the n contour points is obtained as spline interpolation.

$$y = a_m x_m + a_{m-1} x_{m-1} + \cdots + a_0$$

An approximate polynomial for the right lane marker is obtained likewise. At step S7, one is added to an accumulator A, corresponding to coefficients of the polynomial, in Hough space bounded at step S5 and one is also added to the count k of the counter, i.e., A=A+1 and k=k+1. Thereafter, if it is found at step S8 that the count k of the counter is less than a value kmax, the program flow returns to step S6. By selecting another n points from the N contour points of the lane marker, the polynomial is obtained similarly. On the contrary, if it is found at step S8 that the count k of the counter is not less than the value kmax, a maximum accumulator is selected from the accumulators in Hough space and coefficients corresponding to the maximum accumulator are obtained at step S9. Finally, at step S10, a polynomial having the coefficients is obtained as an equation of the lane marker in the image.

Thus, the lane markers of the road can be detected as smooth curves rapidly by the lane detection sensor K1. Meanwhile, if the bounded region in Hough space is determined such that only a region falling within a predetermined range from the accumulator in Hough space, which was obtained in the previous processing, is used, the lane markers of the road can be detected more rapidly.

Figure 5:
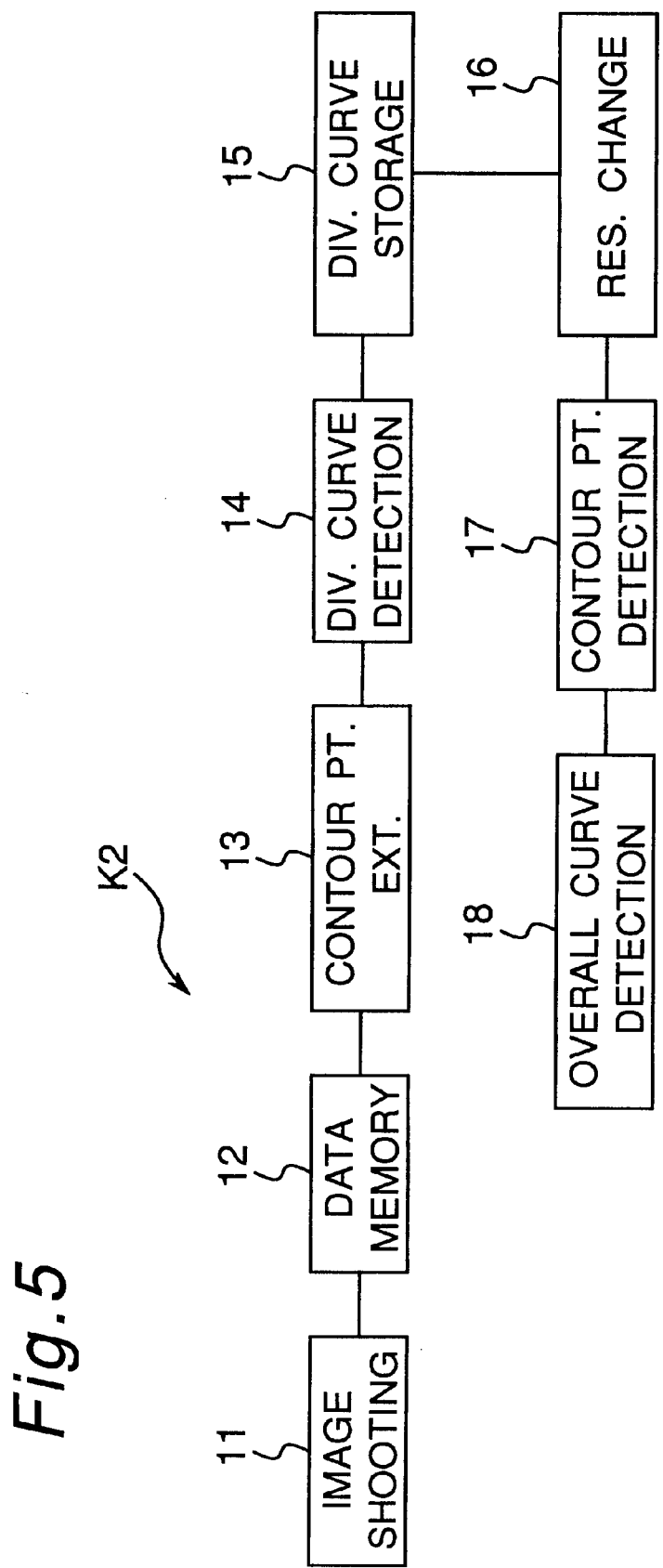
FIG. 5 is a block diagram of a lane detection sensor according to a second embodiment in the one aspect of the present invention.

FIG. 5 shows a lane detection sensor K2 according to a second embodiment in the one aspect of the present invention. The lane detection sensor K2 includes an image shooting means 11 for shooting an image of a road ahead of a running motor vehicle, an image data memory means 12, a contour point extracting means 13, a divisional curve detecting means 14, a divisional curve storage means 15, a resolution changing means 16, a curve contour point detecting means 17 and an overall curve detecting means 18.

Figure 6:
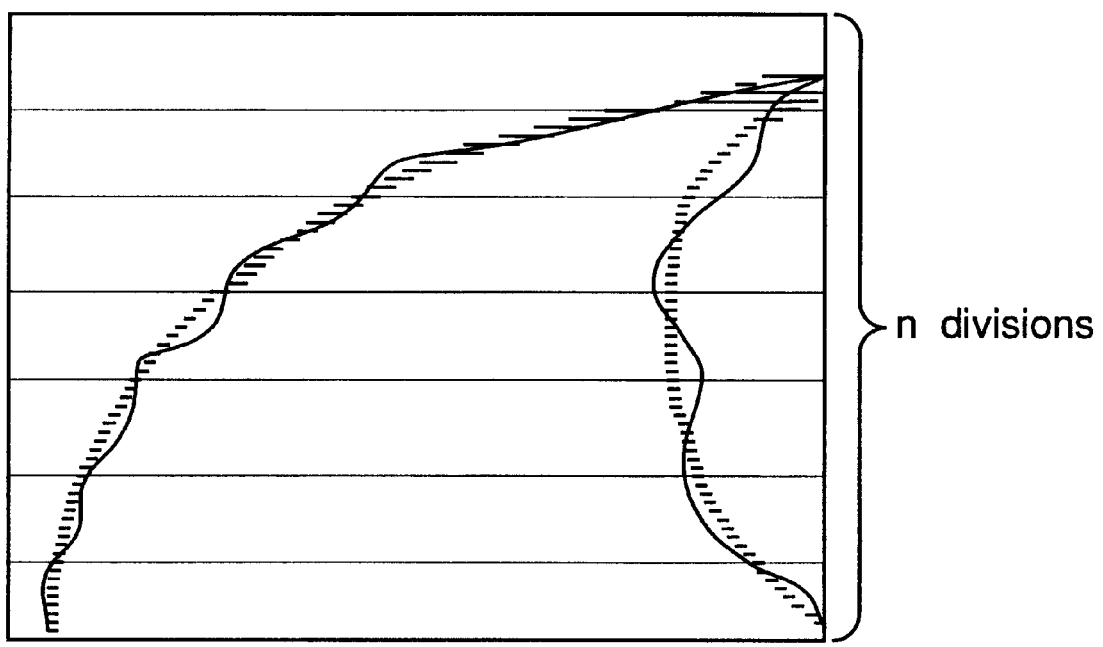
FIG. 6 is a view showing one example of a curve obtained in divided sections in the second embodiment of FIG. 5.

Operation of the lane detection sensor K2 of the above described arrangement is described, hereinafter. Initially, the image of the road ahead of the running motor vehicle is inputted to the lane detection sensor K2 from the image shooting means 11. The inputted image data of the road is temporarily stored in the image data memory means 12. In the contour point extracting means 3, an edge is obtained by using the image data of the road stored in the image data memory means 2 and a threshold value is set from edge intensity of the whole image so as to find edge intensities exceeding initially the threshold value by scanning the image upwardly from a bottom portion of the image and laterally in opposite directions from a center of the image such that the edge intensities are set as contour points of right and left lane markers of the road. As shown in FIG. 6, the image is equally divided vertically into n sections by the divisional curve detecting means 14 and curves in the divided intervals of the image are obtained through spline interpolation by using the contour points referred to above. Equations of the curves obtained by the divisional curve detecting means 14 are stored in the divisional curve storage means 15. By using the equations of the curves stored in the divisional curve storage means 15, the resolution changing means 16 draws the curves on the image data so as to lower resolution of the image. In the curve contour point detecting means 17, edge intensity is again calculated from the image of the lowermost resolution and a threshold value is calculated from the edge intensity so as to obtain contour points of the lane markers of the road. In the overall curve detecting means 18, the lane markers of the overall image are obtained through spline interpolation.

Figure 7:
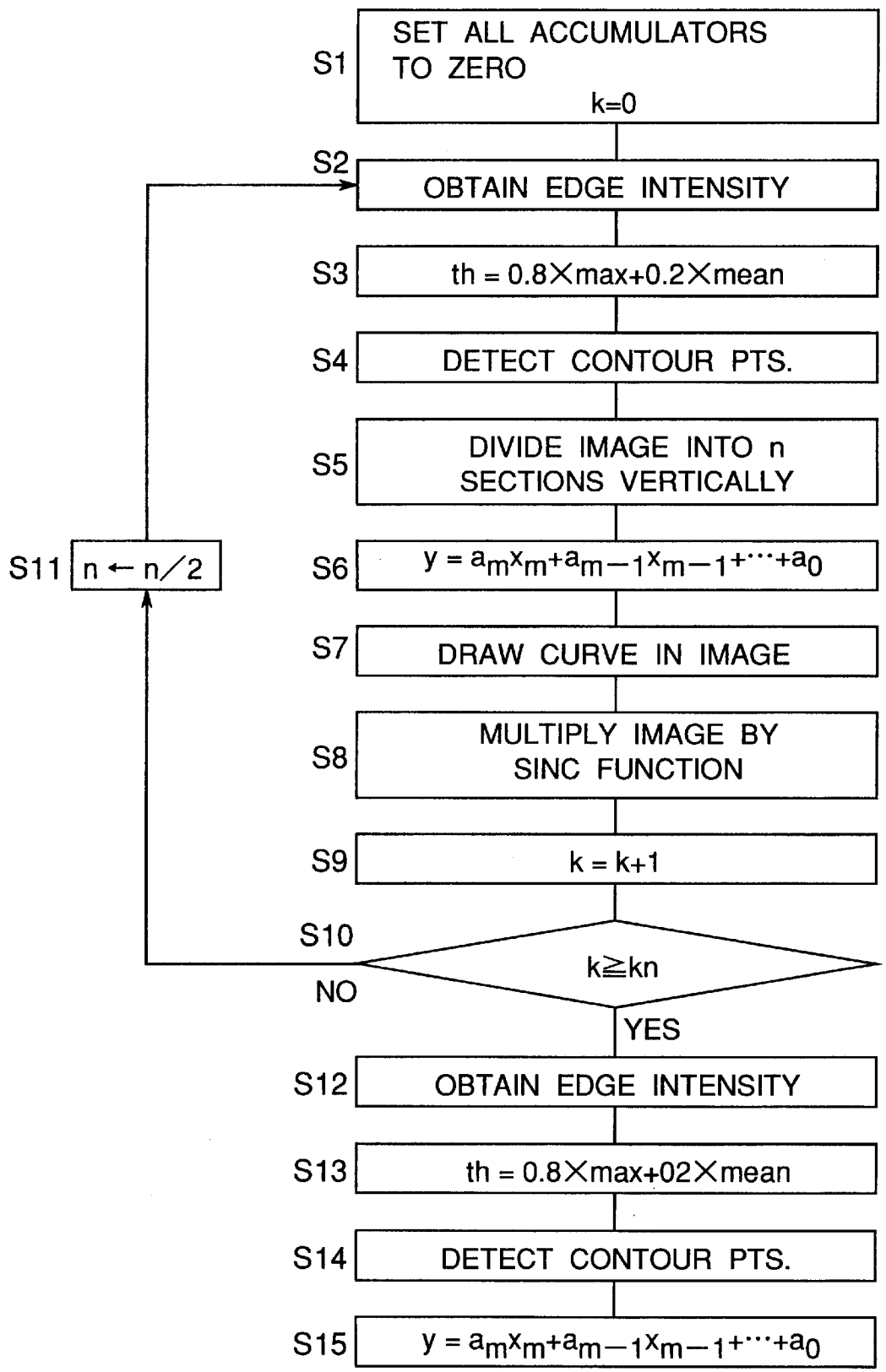
FIG. 7 is a flowchart showing processing sequences of the lane detection sensor of FIG. 5.

Hereinafter, processing sequences of the lane detection sensor K2 are described with reference to a flowchart of FIG. 7. Initially, at step S1, all accumulators in Hough space are set to zero and the count k of the counter is also set to zero. At step S2, edge intensity of the image data stored in the image data memory means 12 is obtained by using a Sobel filter. Then, at step S3, a threshold value th is calculated by using the following equation:

$$th = 0.8 \times max + 0.2 \times mean$$

wherein "max" denotes a maximum value of edge intensity in the image and "mean" denotes a mean value of edge intensity. At step S4, points exceeding initially this threshold value th are retrieved by scanning the image upwardly from the bottom portion of the image and laterally in opposite directions from the center of the image and are set as contour points of the right and left lane markers of the road. Then, at step S5, the image is equally divided vertically into n sections. Subsequently, at step S6, the approximate polynomial in each divided interval of the image is obtained by using contour points in each divided interval of the image.

$$y = a_m x_m + a_{m-1} x_{m-1} + \cdots + a_0$$

At step S7, the curve is drawn in the image on the basis of the polynomials of the curves in the divided intervals of the image. Thereafter, at step S8, the image is multiplied by a sinc function, i.e., a function of (sin f/f) so as to lower resolution of the image. At step S9, one is added to the count k of the counter, i.e., k=k+1. At step S10, it is checked whether or not the count k of the counter is equal to or larger than kn. If in the case of "NO" at step S10, "n" is set to "(n/2)" at step S11 and then, the program flow returns to step S2. On the other hand, in the case of "YES" at step S10, edge intensity of the image is obtained in the same manner as step S2. Subsequently, at step S13, the threshold value th is obtained by using the equation of step S3. Then, at step S14, the contour points are obtained in the same manner as step S4. At step S15, the polynomial of the curve is obtained by using the contour points corresponding to each of the right and left lane markers of the road and is set as the equation of each of the right and left lane markers of the road.

Thus, the lane markers of the road can be detected as smooth curves rapidly by the lane detection sensor K2.

Figure 8:
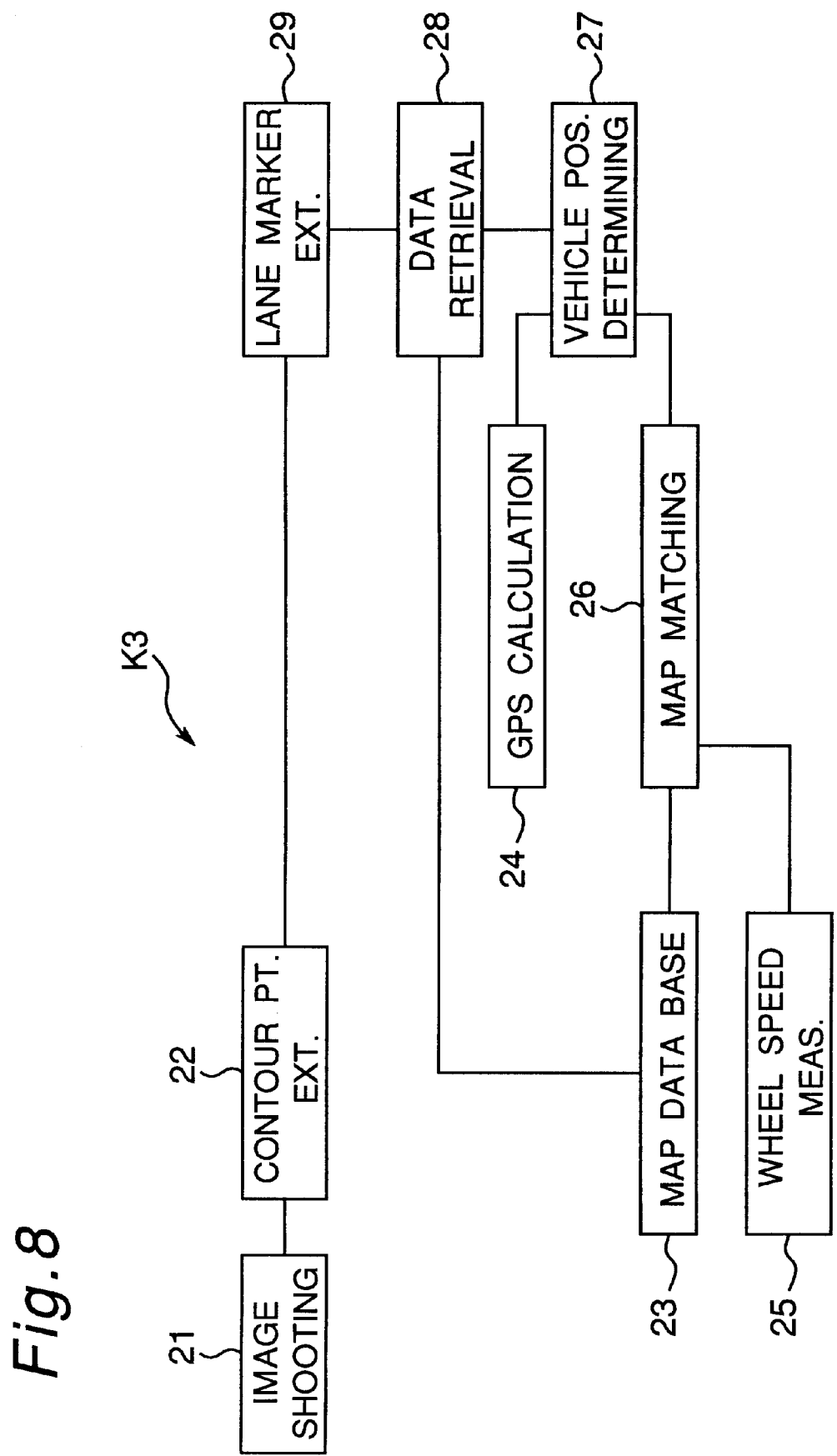
FIG. 8 is a block diagram of a lane detection system according to a third embodiment in the one aspect of the present invention.

FIG. 8 shows a lane detection sensor K3 according to a third embodiment in the one aspect of the present invention. The lane detection sensor K3 includes an image shooting means 21 for shooting an image of a road ahead of a running motor vehicle, a contour point extracting means 22, a map data base 23, a GPS (global positioning system) calculating means 24 for calculating position of the running motor vehicle, a wheel speed measuring means 25, a map matching means 26, a vehicle position determining means 27, a data retrieval means 28 for retrieving data on the road ahead of the running motor vehicle and an extraction means 29 for extracting opposite lane markers of the road.

Operation of the lane detection sensor K3 of the above described arrangement is described, hereinafter. Initially, the image of the road ahead of the running motor vehicle is inputted to the lane detection sensor K3 from the image shooting means 21. In the contour point extracting means 22, an edge is obtained by using the image data of the road from the image shooting means 21 and a threshold value is set from edge intensity of the whole image so as to find edge intensities exceeding initially the threshold value by scanning the image upwardly from a bottom portion of the image and laterally in opposite directions from a center of the image such that the edge intensities are set as contour points of the right and left lane markers of the road. Furthermore, in the map matching means 26, current position of the running motor vehicle is detected based on map data from the map data base 23 and vehicle speed pulses from the wheel speed measuring means 25. In the vehicle position determining means 27, accurate position of the motor vehicle is calculated from position of the motor vehicle detected by the map matching means 26 and position of the motor vehicle calculated by the GPS calculating means 24. In the data retrieval means 28, data on shape of the road ahead of the running motor vehicle is retrieved from the map data base 23 in accordance with data on current position of the running motor vehicle from the vehicle position determining means 27. Meanwhile, in the extraction means 29, shape of the road from the data retrieval means 28 is converted into coordinates on a plane of the image so as to select from the contour points of the contour point extracting means 22, contour points corresponding to the lane markers of the road such that the lane markers of the road are detected by using the contour points.

Figure 9:
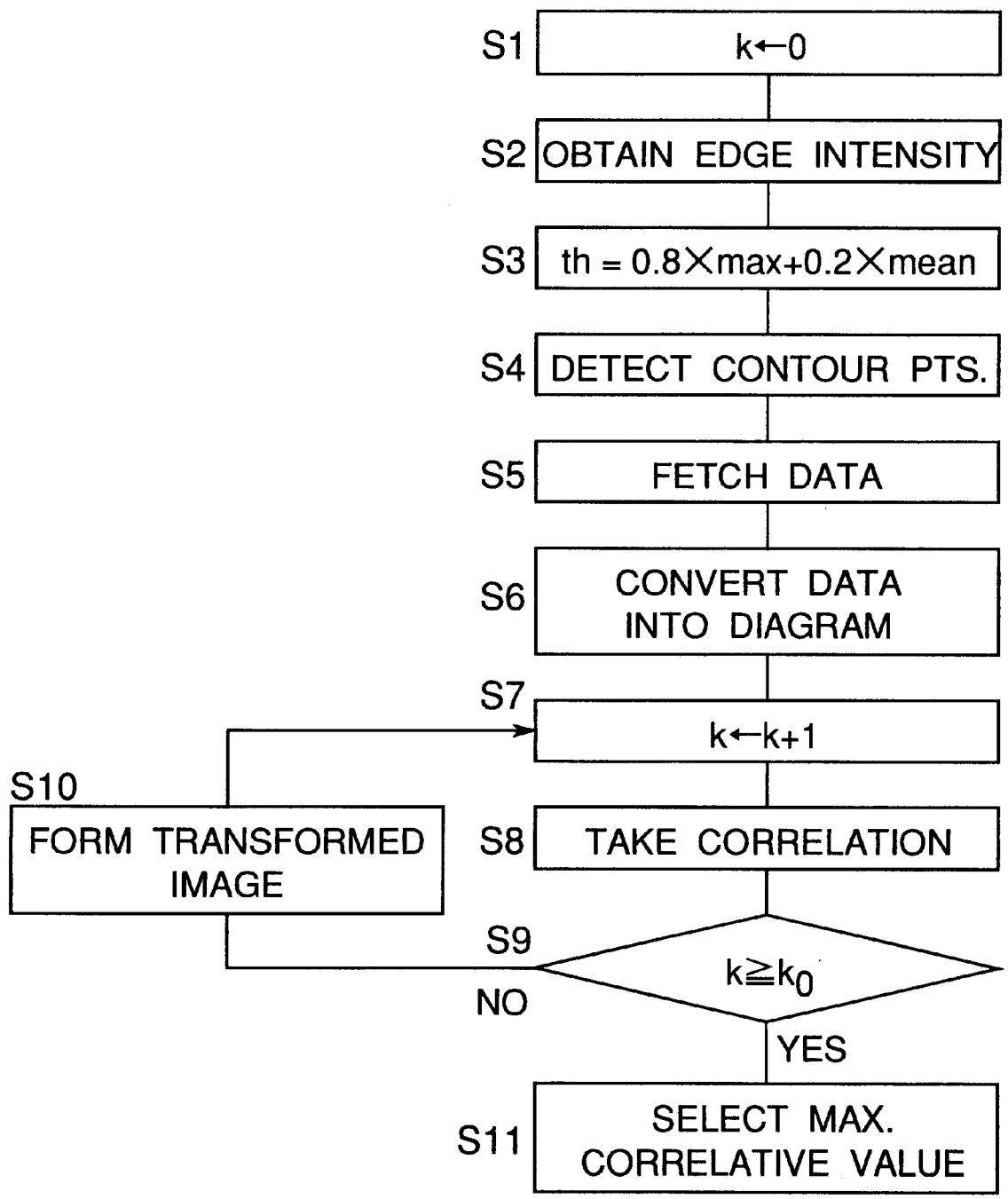
FIG. 9 is a flowchart showing processing sequences of the lane detection system of FIG. 8.
Figure 10:
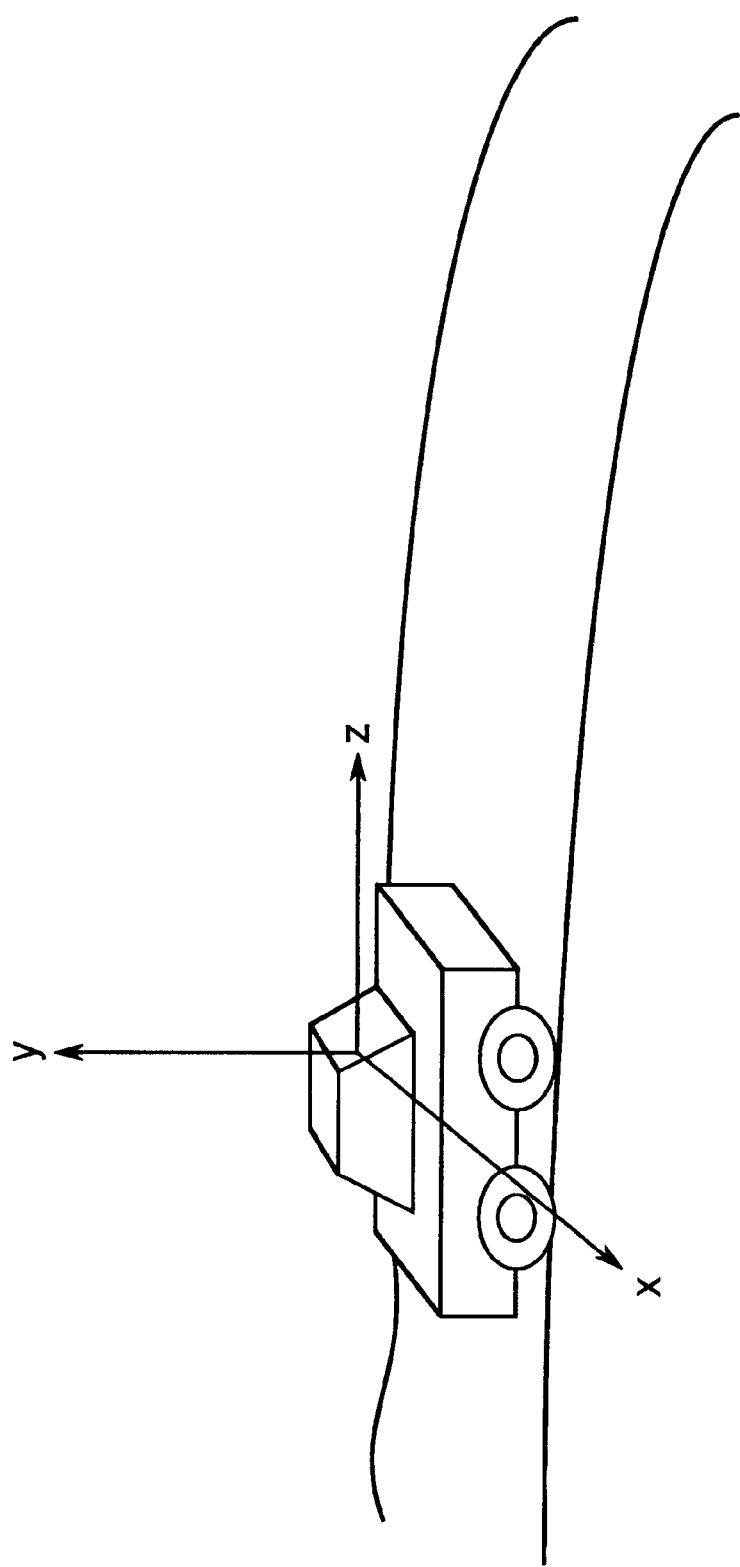
FIG. 10 is a view showing a global system of coordinates in the third embodiment of FIG. 8.

Hereinafter, processing sequences of the lane detection sensor K3 are described with reference to a flowchart of FIG. 9. Initially, at step S1, the count k of the counter is set to zero. At step S2, edge intensity is obtained from the image data by using a Sobel filter. Then, at step S3, a threshold value th is calculated by using the following equation:

$$th = 0.8 \times \max + 0.2 \times \text{mean}$$

wherein "max" denotes a maximum value of edge intensity in the image and "mean" denotes a mean value of edge intensity. At step S4, points exceeding initially this threshold value th are retrieved by scanning the image upwardly from the bottom portion of the image and laterally in opposite directions from the center of the image and are set as contour points of the right and left lane markers of the road. Then, at step S5, the data on the road ahead of the running motor vehicle is fetched from the map data base 23 on the basis of current position (X, Y) of the motor vehicle on the map. Subsequently, at step S6, the data on the road ahead of the running motor vehicle is converted, by using an equation of perspective transformation, into a diagram on a plane of the image as observed from a global system (x, y, z) of coordinates shown in FIG. 10. Thereafter, at step S7, one is added to the count k of the counter. Then, at step S8, correlation between the contour points of step S4 and the converted diagram of step S6 is taken. If it is found at step S8 that the count k of the counter is less than $k_0$, an image in which the data of the map data base 23 is rotated through $\theta$ about y-axis is formed at step S10 and then, the program flow returns to step S7. On the other hand, if it is found at step S9 that the count k of the counter is not less than $k_0$, an image having a maximum correlative value is selected as the lane markers of the road.

Thus, the lane markers of the road ahead of the running motor vehicle can be detected accurately by the lane detection sensor K3.

Figure 11:
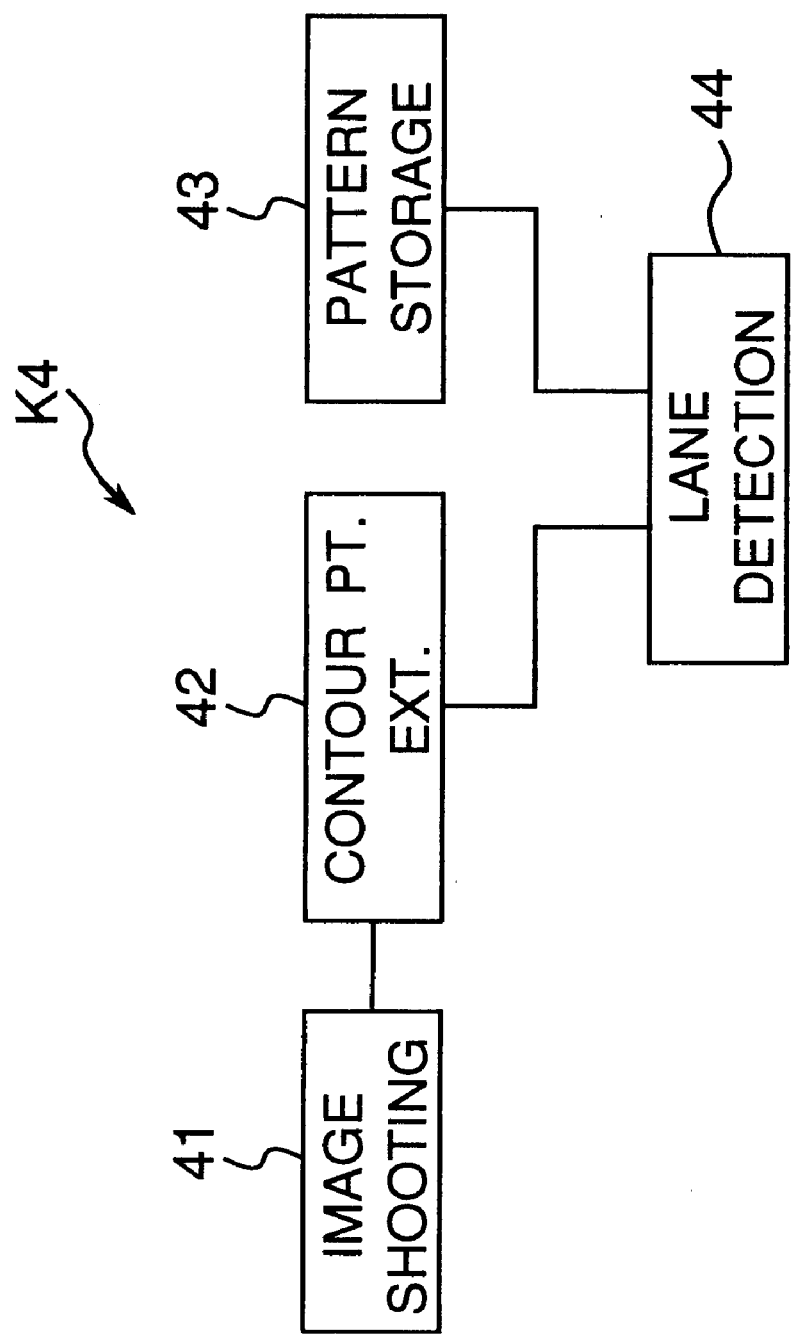
FIG. 11 is a block diagram of a lane detection sensor according to a fourth embodiment in the one aspect of the present invention.

FIG. 11 shows a lane detection sensor K4 according to a fourth embodiment in the one aspect of the present invention. The lane detection sensor K4 includes an image shooting means 41 for shooting an image of a road ahead of a running motor vehicle, a contour point extracting means 42, a pattern storage means 43 for storing patterns of shape of the road and a lane detection means 44 for detecting right and left lane markers of the road.

Hereinafter, operation of the lane detection sensor K4 of the above described arrangement is described. Initially, the image of the road ahead of the running motor vehicle is inputted to the lane detection sensor K4 from the image shooting means 41. In the contour point extracting means 42, an edge is obtained by using the image data of the road from the image shooting means 41 and a threshold value is set from edge intensity of the whole image so as to find edge intensities exceeding initially the threshold value by scanning the image upwardly from a bottom portion of the image and laterally in opposite directions from a center of the image such that the edge intensities are set as contour points of the right and left lane markers of the road. On the other hand, various patterns of shape of the road as observed at a height of the image shooting means 41 from a road surface at a dip relative to horizon are preliminarily stored in the pattern storage means 43. Meanwhile, in the lane detection means 44, correlative values between the contour points of the right and left lane markers of the road obtained by the contour point extracting means 42 and the patterns of the shape of the road stored in the pattern storage means 43 are calculated and a maximum of the correlative values is judged as the shape of the road ahead of the running motor vehicle.

Figure 12:
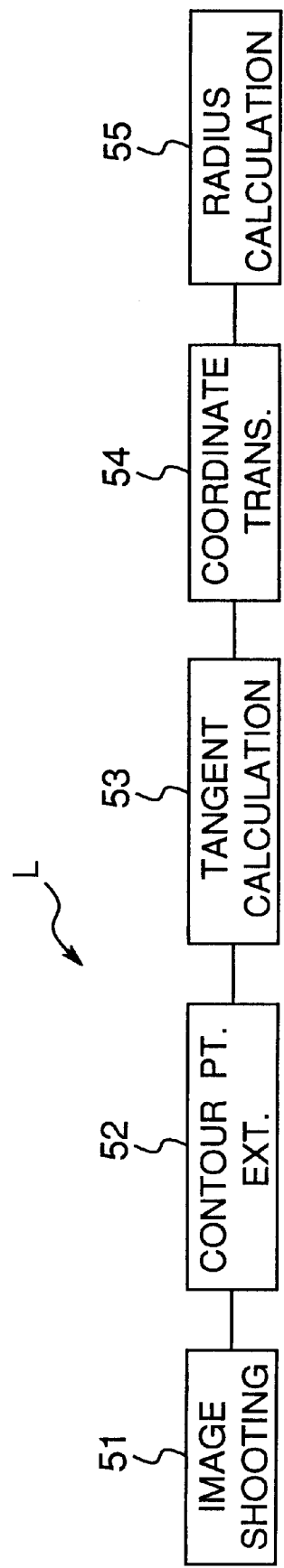
FIG. 12 is a block diagram of an arithmetic unit for calculating a radius of curvature of a road, according to one embodiment in another aspect of the present invention.

FIG. 12 shows an arithmetic unit L for calculating a radius of curvature of a road, according to one embodiment in another aspect of the present invention. The arithmetic unit L includes an image shooting means 51 for shooting an image of a road ahead of a running motor vehicle, a contour point extracting means 52, a tangent calculating means 53, a coordinate transformation means 54 and a calculating means 55 for calculating the radius of curvature of the road.

Figure 13:
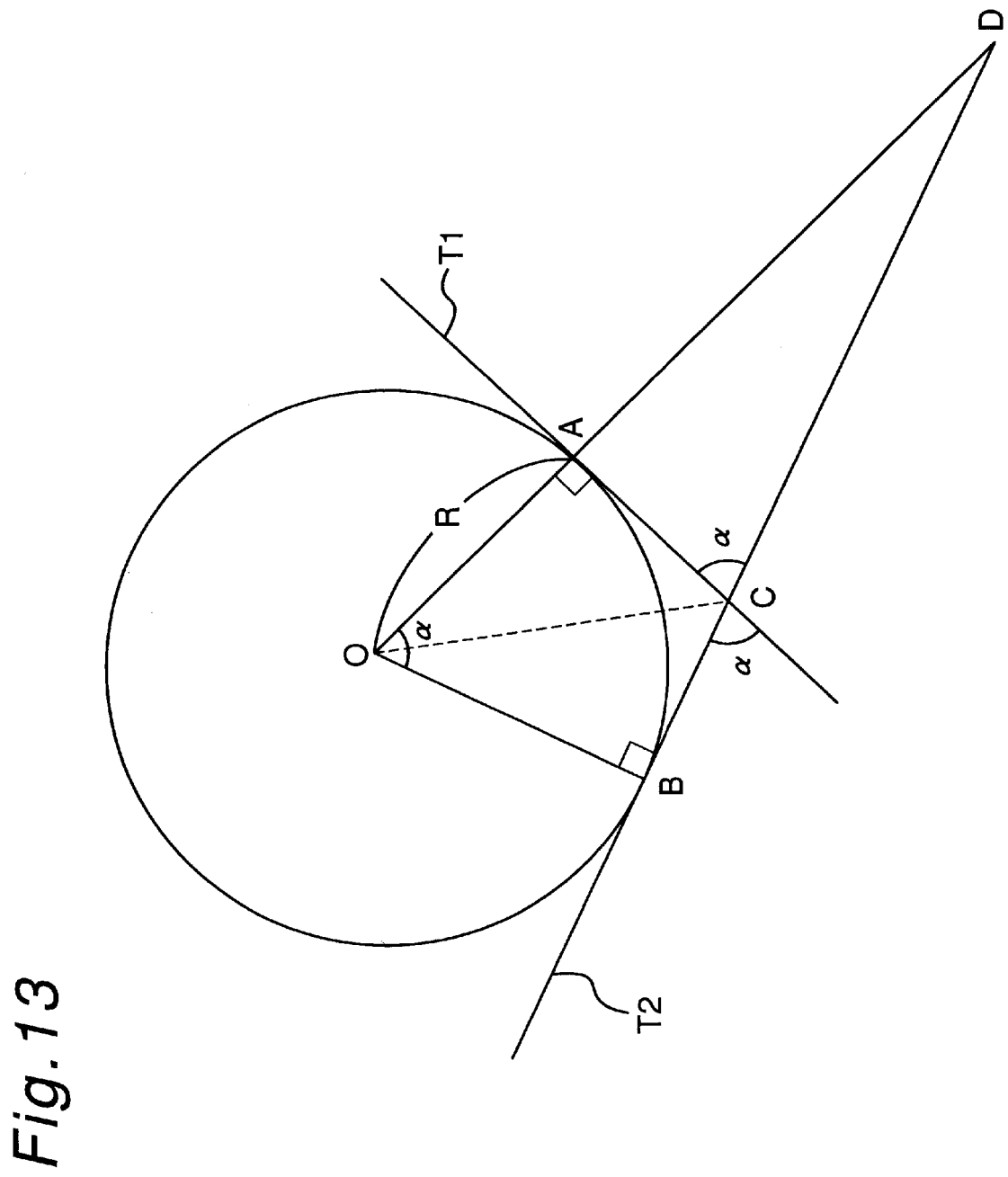
FIG. 13 is a view showing a method of calculating the radius of curvature of the road in the arithmetic unit of FIG. 12.

Hereinafter, operation of the arithmetic unit L of the above described arrangement is described. Initially, the image of the road ahead of the running motor vehicle is inputted to the arithmetic unit L from the image shooting means 51. In the contour point extracting means 52, an edge is obtained by using the image data of the road from the image shooting means 51 and a threshold value is set from edge intensity of the whole image so as to find edge intensities exceeding initially the threshold value by scanning the image upwardly from a bottom portion of the image and laterally in opposite directions from a center of the image such that the edge intensities are set as contour points of right and left lane markers of the road. In the tangent calculating means 53, tangents are obtained at two points spaced a straight distance L from each other in a global system of coordinates. In order to obtain the tangents at the two points, Hough transformation in which a straight line is detected by using n points in the vicinity of each of the two points is employed. Then, in the coordinate transformation means 54, the two tangents referred to above are transformed, by using perspective transformation, into the global system of coordinates. In the calculating means 55, an angle a formed between the two tangents T1 and T2 is obtained as shown in FIG. 13. In FIG. 13, $\angle AOC = \angle BOC = \alpha/2$ and thus, the following relation between a radius R of curvature and the angle $\alpha$ is obtained.

$$R = AC/\tan(\alpha/2)$$

By setting AC to be approximate to (L/2), the above equation is changed as follows.

$$R = L/2 \tan(\alpha/2)$$

Thus, the radius of curvature of the road can be simply obtained highly accurately by the arithmetic unit L.

Figure 14:
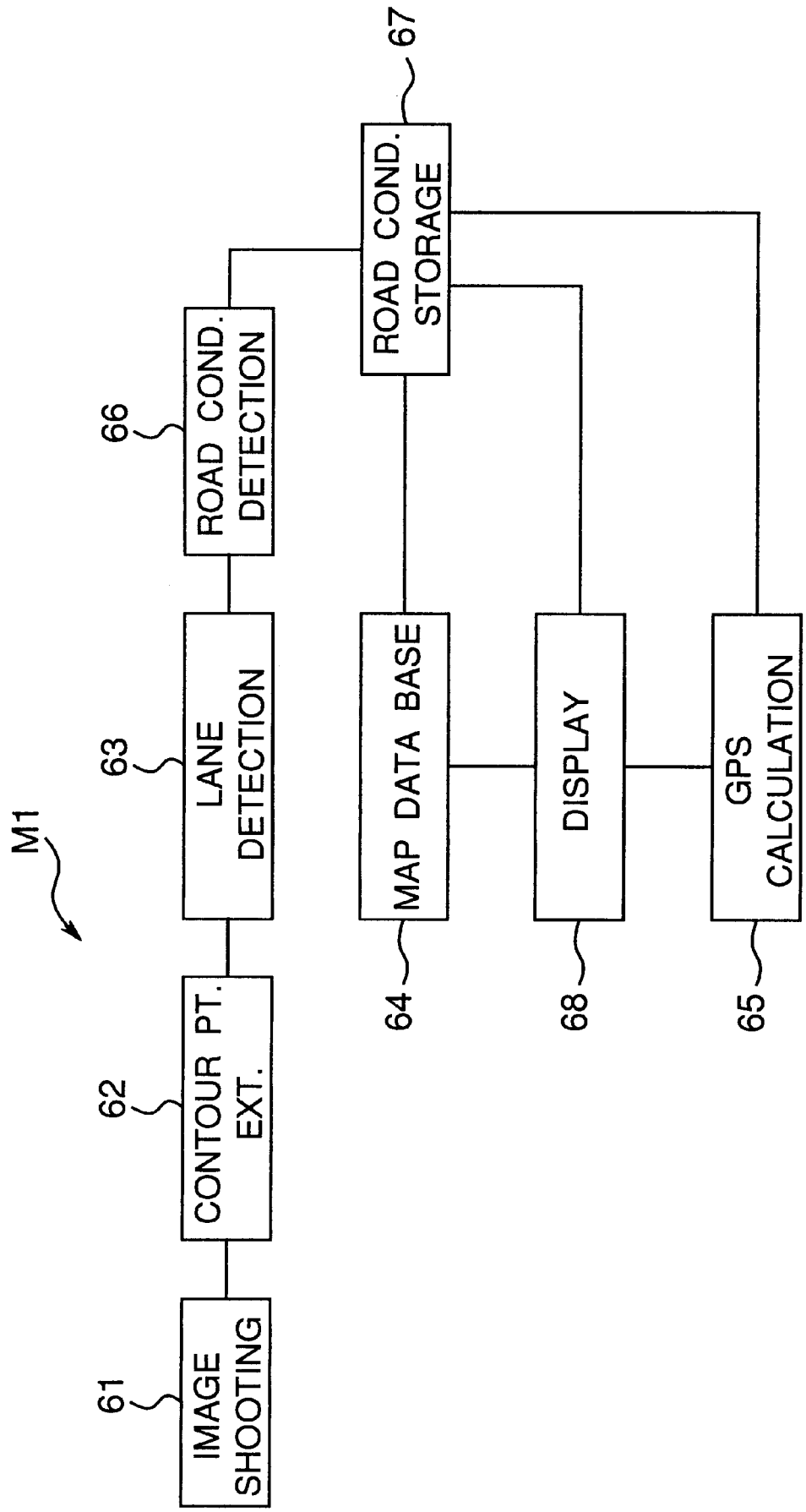
FIG. 14 is a block diagram of a navigation system according to a first embodiment in a further aspect of the present invention.

FIG. 14 shows a navigation system M1 according to a first embodiment in a further aspect of the present invention. The navigation system M1 includes an image shooting means 61 for shooting an image of a road ahead of a running motor vehicle, a contour point extracting means 62, a lane detecting means 63, a map data base 64, a GPS calculating means 65 for calculating position of the running motor vehicle, a road condition detecting means 66, a road condition storage means 67 and a display means 68.

Hereinafter, operation of the navigation system M1 of the above described arrangement is described. Initially, the image of the road ahead of the running motor vehicle is inputted to the navigation system M1 from the image shooting means 61. In the contour point extracting means 62, an edge is obtained by using the image data of the road from the image shooting means 61 and a threshold value is set from edge intensity of the whole image so as to find edge intensities exceeding initially the threshold value by scanning the image upwardly from a bottom portion of the image and laterally in opposite directions from a center of the image such that the edge intensities are set as contour points of right and left lane markers of the road. In the lane detecting means 63, all lane markers are detected as straight lines from the above mentioned contour points through Hough transformation. In the road condition detecting means 66, the lane of the road is obtained by using the detected lane markers. Meanwhile, from a width between the detected right and left lane markers of the lane on which the motor vehicle is running, a width of the lane is obtained in a global system of coordinates.

On the other hand, the number and widths of lanes of the road from the road condition detecting means 66 are stored in the road condition storage means 67 on the basis of map data from the map data base 64 by using data on current position of the motor vehicle from the GPS calculating means 65. In the display means 68, not only the map data from the map data base 64 is displayed on the basis of data on current position of the motor vehicle from the GPS calculating means 65 but the number and widths of the lanes of the road up to a destination are stored in association with the map data and are displayed.

Once the motor vehicle equipped with the navigation system M1 has run on one road, the number and widths of lanes of the road are stored in association with the map. Therefore, in case the motor vehicle runs on the same road again, data on the road can be obtained beforehand.

Figure 15:
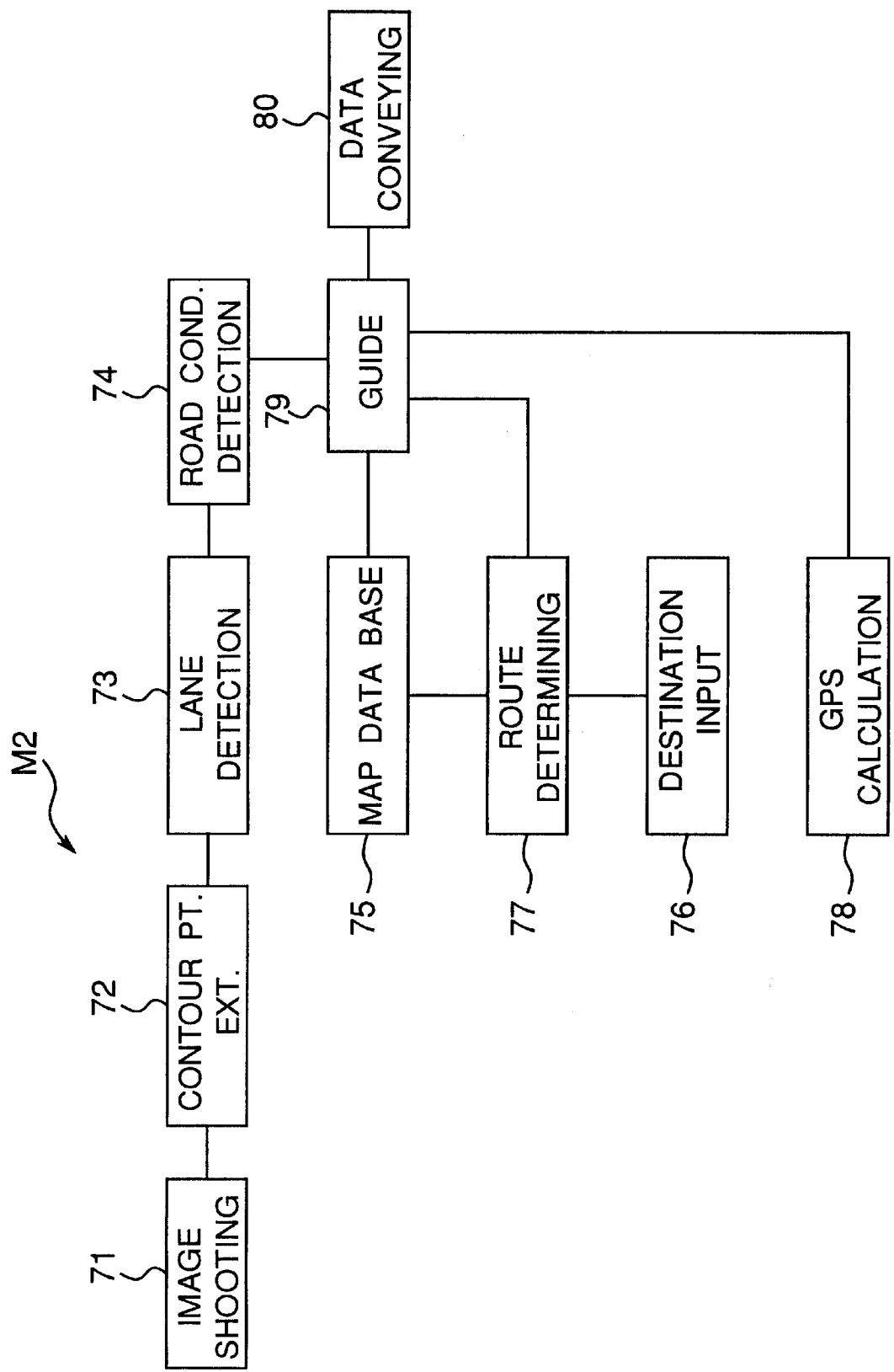
FIG. 15 is a block diagram of a navigation system according to a second embodiment in the further aspect of the present invention.
Figure 16:
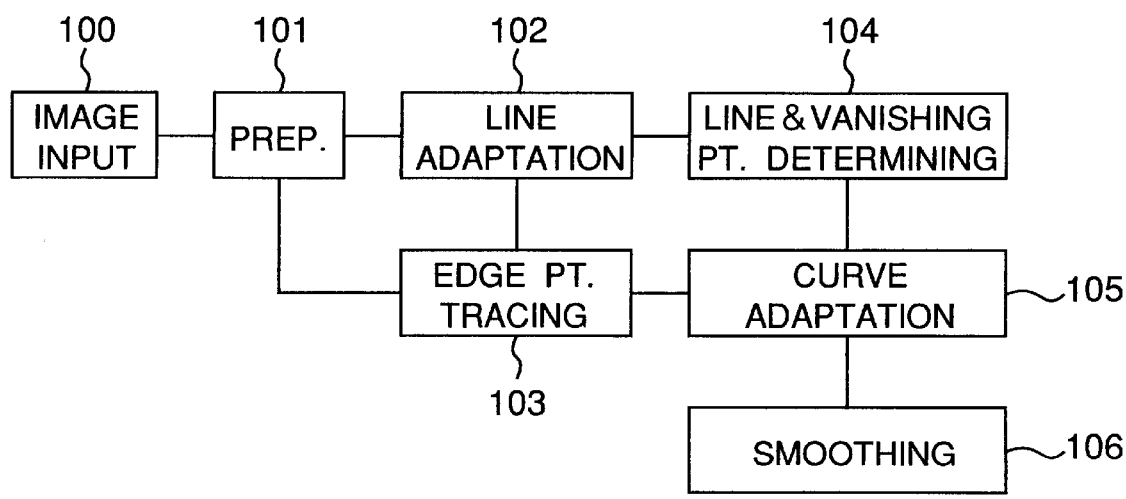
FIG. 16 is a block diagram of a prior art lane detection sensor (referred to above)
Figure 17:
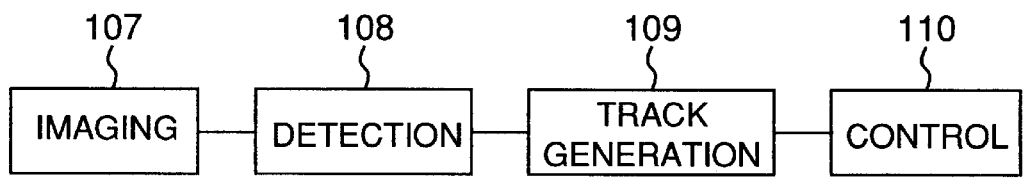
FIG. 17 is a block diagram of a prior art arithmetic unit for calculating a radius of curvature of a road (referred to above).

FIG. 15 shows a navigation system M2 according to a second embodiment in the further aspect of the present invention. The navigation system M2 includes an image shooting means 71 for shooting an image of a road ahead of a running motor vehicle, a contour point extracting means 72, a lane detecting means 73, a road condition detecting means 74, a map data base 75, a destination input means 76, a running route determining means 77, a GPS calculating means 78 for calculating position of the running motor vehicle, a guide means 79 and a data conveying means 80.

Hereinafter, operation of the navigation system M2 of the above described arrangement is described. Initially, the image of the road ahead of the running motor vehicle is inputted to the navigation system M2 from the image shooting means 71. In the contour point extracting means 72, an edge is obtained by using the image data of the road from the image shooting means 71 and a threshold value is set from edge intensity of the whole image so as to find edge intensities exceeding initially the threshold value by scanning the image upwardly from a bottom portion of the image and laterally in opposite directions from a center of the image such that the edge intensities are set as contour points of right and left lane markers of the road. In the lane detecting means 73, all lane markers are detected as straight lines from the above mentioned contour points through Hough transformation. In the road condition detecting means 74, the number of lanes of the road and position of the lane on which the motor vehicle is running are obtained by using the detected lane markers. In the running route determining means 77, a running route of the motor vehicle is obtained from the map data of the map data base 75 and a destination which a driver of the motor vehicle has inputted by operating the running route determining means 77. In the guide means 79, the lane on which the motor vehicle should run is determined by utilizing data on position of the motor vehicle from the GPS calculating means 78, the map data from the map data base 75 based on the data on position of the motor vehicle and the running route up to the destination from the running route determining means 77 and data on lane change is formulated by utilizing the number of the lanes and the position of the lane on which the motor vehicle is running, which are obtained by the road condition detecting means 74. The data conveying means 80 gives to the driver the data on lane change.

By recognizing from the road image of the image shooting means 71, position of the lane on which the motor vehicle is running, concrete data for guiding the motor vehicle to the running route can be supplied to the driver by the navigation system M2.

As is clear from the foregoing description of the lane detection sensor of the present invention, the lane markers of the road can be detected as smooth curves rapidly and accurately.

Meanwhile, the radius of curvature of the road can be simply obtained accurately by the arithmetic unit of the present invention for calculating the radius of curvature of the road.

Furthermore, in the navigation system of the present invention, unique data on the road can be formulated. In case the motor vehicle runs on the same road again, data on the road can be obtained beforehand. In addition, such an effect can be gained that the motor vehicle can be guided to the destination by concrete data.

What is claimed is:

1. A lane detection sensor for detecting opposite lane markers of a road, comprising:
    an image shooting means for shooting an image of the road ahead of a running motor vehicle;
    an image data memory means for storing data on the image of the road from the image shooting means;
    a contour point extracting means for extracting, by using the data on the image of the road stored in the image data memory means, contour points corresponding to the lane markers of the road;
    a curve detecting means for calculating polynomial curves by using the contour points corresponding to the lane markers of the road extracted by the contour point extracting means;
    a Hough transformation limiting means for bounding a region of Hough transformation by using coefficients of the polynomial curves calculated by the curve detecting means;
    a Hough transformation means for performing Hough transformation by using the polynomial curves from the curve detecting means and the region of Hough transformation bounded by the Hough transformation limiting means; and
    a Hough transformation detecting means for obtaining a maximum value of accumulators in Hough space so as to detect a curve corresponding to the maximum value of the accumulators.

2. A lane detection sensor as claimed in claim 1, wherein the curve detecting means is for calculating a plurality of the polynomial curves by using plural ones of the contour points and the Hough transformation means is for adding a predetermined numerical value to an array of the accumulators corresponding to the coefficients of the polynomial curves in Hough space bounded by the Hough transformation limiting means.

3. A lane detection sensor for detecting opposite lane markers of a road, comprising:
    an image shooting means for shooting an image of the road ahead of a running motor vehicle;
    an image data memory means for storing data on the image of the road from the image shooting means;
    a contour point extracting means for extracting, by using the data on the image of the road stored in the image data memory means, contour points corresponding to the lane markers of the road;
    a divisional curve detecting means for vertically dividing the image into a plurality of image sections and calculating a polynomial curve in each of the image sections from the contour points contained in each of the image sections;
    a divisional curve storage means for storing the polynomial curve calculated by the divisional curve detecting means;
    a resolution changing means for drawing the polynomial curve stored in the divisional curve storage means on the image and lowering resolution of the image;
    a curve contour point detecting means for obtaining further contour points by using the lower resolution image from the resolution changing means; and
    an overall curve detecting means for obtaining a further polynomial curve by using the further contour points obtained by the curve contour point detecting means.

4. A lane detection sensor for detecting opposite lane markers of a road, comprising:
    an image shooting means for shooting an image of the road ahead of a running motor vehicle;
    a contour point extracting means for extracting from data on the image of the road from the image shooting means, contour points corresponding to the lane markers of the road;
    a map data base for storing data on the road on a map;
    a GPS (global positioning system) calculating means for estimating the position of the motor vehicle upon reception of electromagnetic wave a signal from a GPS;
    a wheel speed measuring means for measuring a wheel speed of the motor vehicle;
    a map matching means for estimating position of the motor vehicle on the map through map matching based on pulses of the wheel speed from the wheel speed measuring means and the data on the road on the map from the map data base;
    a vehicle position determining means for determining the position of the motor vehicle accurately by using the position of the motor vehicle estimated by the GPS calculating means from the GPS and the position of the motor vehicle estimated by the map matching means;
    a data retrieval means for retrieving data on the road ahead of the running motor vehicle from the map data base on the basis of the position of the motor vehicle determined by the vehicle position determining means; and
    an extraction means from preliminarily calculating the shape of the road on the image on the basis of the data retrieved by the data retrieval means and obtaining a correlation between the calculated shape of the road and the shape of the road predicted from the contour points of the contour point extracting means so as to extract the lane markers of the road.

5. A lane detection sensor for detecting opposite lane markers of a road, comprising:
    an image shooting means for shooting an image of the road ahead of a running motor vehicle;
    a contour point extracting means for extracting from data on the image of the road from the image shooting means, contour points corresponding to the lane markers of the road;
    a pattern storage means for preliminarily storing a plurality of patterns of the shape of the road as observed from the image shooting means disposed at a height from a road surface and at a dip relative to the horizon; and
    a lane detection means for obtaining a correlation between the contour points extracted by the contour points extracting means and the plurality of patterns of the shape of the road stored in the pattern storage means so as to detect the lane markers of the road.

6. An arithmetic unit for calculating a radius of curvature of a road ahead of a running motor vehicle, comprising:

an image shooting means for shooting an image of the road;

a contour point extracting means for extracting from data on the image of the road from the image shooting means, contour points corresponding to opposite lane markers of the road;

a tangent calculating means for obtaining, by using the contour points from the contour point extracting means, two tangents at two positions spaced arbitrary distances from a point ahead of the motor vehicle;

a coordinate transformation means for transforming the two tangents from the tangent calculating means into a real global system of coordinates; and a calculating means for approximately calculating from an angle formed between the two tangents in the real global system of coordinates, the radius of curvature of a lane on which the motor vehicle is running.

7. A navigation system comprising:

an image shooting means for shooting an image of a road ahead of a running motor vehicle;

a contour point extracting means for extracting from data on the image of the road from the image shooting means, contour points corresponding to opposite lane markers of the road;

a lane detecting means for detecting, by using the contour points from the contour point extracting means, the road on which the motor vehicle is running and the lane markers of lanes of the road;

a map data base for storing data on the road on a map;

a GPS (global positioning system) calculating means for estimating the current position of the motor vehicle upon reception of signal from a GPS;

a road condition detecting means for obtaining width and the number of the lanes from position and shape of the lane markers in the image from the lane detecting means;

a road condition storage means for storing, in accordance with the current position of the motor vehicle from the GPS calculating means, the width and the number of the lanes from the road condition detecting means in association with the data on the road on the map of the map data base; and a display means for displaying the current position of the motor vehicle from the GPS calculating means, the data on the road on the map from the map data base and data on the road on which the motor vehicle is running, from the road condition storage means.

8. A navigation system comprising:

an image shooting means for shooting an image of a road ahead of a running motor vehicle;

a contour point extracting means for extracting from data on the image of the road from the image shooting means, contour points corresponding to opposite lane markers of the road;

a lane detecting means for detecting, by using the contour points from the contour point extracting means, the road on which the motor vehicle is running and the lane markers of lanes of the road;

a map data base for storing data on the road on a map;

a destination input means for inputting a destination of the motor vehicle;

a running route determining means for determining a running route of the motor vehicle from the destination of the destination input means and the data on the road on the map of the map data base;

a GPS (global positioning system) calculating means for estimating the current position of the motor vehicle upon reception of a signal from a GPS;

a road condition detecting means for obtaining the number of the lanes and data on a lane having the motor vehicle running thereon, from a position and shape of the lane markers in the image from the lane detecting means;

a guide means for obtaining, by using the data on the road on the map from the map data base, the running route from the running route determining means, the estimated current position of the motor vehicle from the GPS calculating means and the number of the lanes and the data on the lane having the motor vehicle running thereon from the road condition detecting means, a lane to be taken so as to determine a shifting direction of the motor vehicle and position of the lane to be taken; and a data conveying means for informing a driver of the motor vehicle of data on the shifting direction of the motor vehicle and the position of the lane to be taken, from the guide means.

* * * * *